United States Patent [19]

Richard

[11] 4,325,478

[45] Apr. 20, 1982

[54] TRANSPORT BELT INTENDED FOR TRANSPORTING PRODUCTS AT A HIGH TEMPERATURE, AND A TRANSPORT MEANS EQUIPPED WITH THIS BELT

[75] Inventor: Gerard Y. Richard, Precy sur Oise, France

[73] Assignee: Societe d'Applications de Procedes Industriels et Chimiques, France

[21] Appl. No.: 84,076

[22] Filed: Oct. 12, 1979

Related U.S. Application Data

[63] Continuation of Ser. No. 827,844.

[30] Foreign Application Priority Data

Sep. 2, 1976 [FR] France .................. 76 26441
Nov. 25, 1976 [FR] France .................. 76 35474

[51] Int. Cl.$^3$ .............................................. B65G 15/44
[52] U.S. Cl. ............................ 198/699; 198/711; 198/822; 198/850; 198/952; 414/157; 432/235
[58] Field of Search ............. 198/688, 698, 699, 711, 198/822, 844, 850, 952; 432/235; 266/177; 414/157

[56] References Cited

U.S. PATENT DOCUMENTS

| 3,314,666 | 4/1967 | Gajardo | 266/177 |
| 3,687,433 | 8/1972 | Bode | 432/235 |
| 4,062,459 | 12/1977 | Robertson | 414/157 |

FOREIGN PATENT DOCUMENTS

| 622404 | 6/1961 | Canada | 198/688 |
| 352226 | 4/1922 | Fed. Rep. of Germany | 198/850 |
| 567438 | 3/1924 | France | 198/711 |
| 1357276 | 6/1974 | United Kingdom | 198/711 |
| 241485 | 9/1969 | U.S.S.R. | 414/157 |

*Primary Examiner*—Joseph E. Valenza
*Attorney, Agent, or Firm*—Richard L. Johnston

[57] ABSTRACT

A transport belt for a conveyor or bucket conveyor especially for transporting products whose temperature exceeds 200° C. is provided wherein a flexible belt carries on its outer face a metal carrier means adapted to receive or pick up the hot products which are to be transported, said metal carrier means being secured to said belt and the metal carrier means being at least partially thermally insulated from the belt by one or more cushions of air formed by one or more pockets of heat insulating air space between the bottom of the metal carrier means intermediate its ends and the outer face of the belt, said pockets being defined by a shaped member which contacts said belt at one or more intervals with a line or point contact providing one or more zones of minimum contact between said metal carrier means and said belt whereby heat transfer between said metal carrier means and said belt is minimized.

2 Claims, 16 Drawing Figures

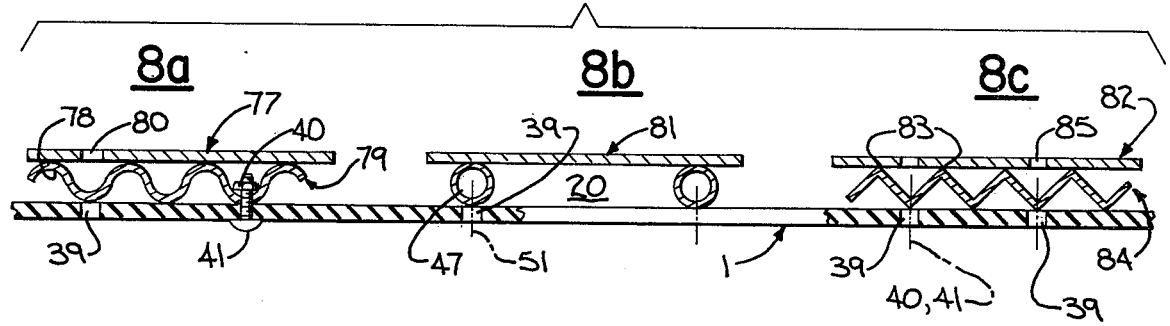
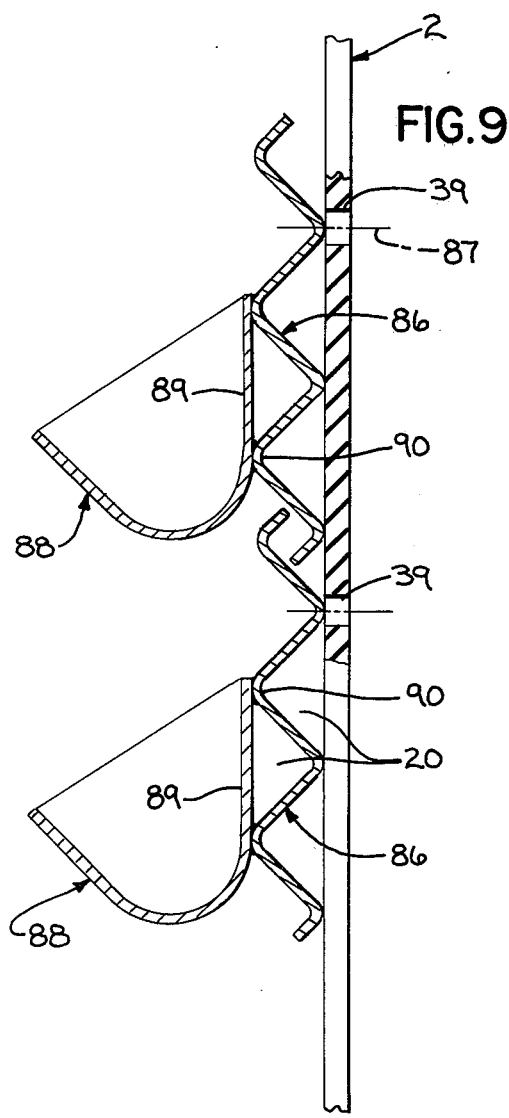
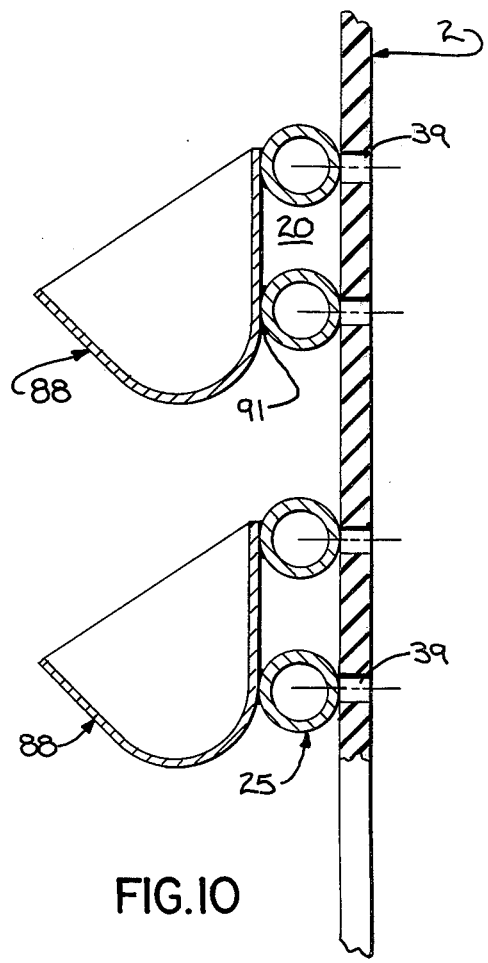

TRANSPORT BELT INTENDED FOR TRANSPORTING PRODUCTS AT A HIGH TEMPERATURE, AND A TRANSPORT MEANS EQUIPPED WITH THIS BELT

This is a continuation of application Ser. No. 827,844, filed Aug. 26, 1977, now abandoned.

The present invention relates to a transport belt for a conveyor or a bucket elevator, which is intended in particular for conveying products at a high temperature, particularly products whose temperature is higher than 200° C.

The invention is applicable to all types of conveyor belts, particularly flexible conveyor belts, especially those of rubber, or those of silicones, plastics materials, leather, a textile material, or a metal strip.

It is quite obvious that the invention also relates to transport means, such as conveyors or bucket elevators, which are equipped with the type of belt whose characteristics correspond to those indicated above.

In industries such as foundry, metallurgy, siderurgy, the cement industry, or the glass industry, for example, the transport of products at high temperatures entails considerable problems to which no real solution has yet been found.

Two types of conveyor are used at the present time: conveyors of the flexible belt type, principally with rubber belts, and entirely metallic conveyors.

From the practical point of view conveyors of the first type offer all the advantages: their operation is regular and very flexible, and in addition they can be driven at very high speeds of the order of 4 meters per second, so that excellent productivity is achieved.

Unfortunately, conveyors of this first type have a limitation, which is obviously inherent in the materials which are used in the production of the belt. This limitation is imposed by temperature.

In this connection it will be recalled that it is well known to use for transport purposes belts made of materials having relative flexibility, among which mention may be made in particular, and without limitation, of rubbers, silicones, plastics materials, leathers, textile materials, and even belts made of metal strips, particularly belts of stainless steel.

However, on the basis of the present technology of the materials mentioned, particularly the technology of elastomers, it is considered impossible to exceed a temperature of from 200° to 220° C. for the products to be transported.

In other words, it is certain that a conveyor belt produced from at least one of the materials mentioned above cannot be used for transporting products whose temperature is higher than about 200°, since the heat resistance properties of the material of which the conveyor belt is made are inadequate.

The temperature value of 200° indicated above is applicable generally, with the exception however of metal strip, because it should be known that in the particular case of bands of stainless steel the maximum temperature value rises to 350° C. It should nevertheless be emphasized that all the materials indicated above have the common feature that for the transport of hot products their temperature limits are in any case very low, being 200° in general and 350° for bands of stainless steel.

As the result of all that has been stated above all-metal conveyors are therefore used in cases where the temperature of the products to be transported exceeds 200° C.

These all-metal conveyor belts can be fitted either to horizontal conveyors or to bucket elevators.

For example belts composed of overlapping metal plates and driven by chains are known. These belts have the disadvantage of leaking when carrying fine-grained products or pulverulent products, as is frequently the case in the industries mentioned previously.

Conveyors are also known which are in the form of belts composed of metal mesh, which may or may not be protected by plates or containers likewise of metal. French Pat. No. 73.47129-2 212 278 and British Pat. No. 1,357,276 describe more particularly a flexible belt of metal mesh protected by a series of plates which do not modify the flexibility of the belt.

Nevertheless, all these conveyors and elevators made entirely of metal which are used for transporting products at high temperature have the common feature that they operate under very poor mechanical conditions, the expansions being heterogeneous and wear often being very rapid when the conveyor or elevator has to work in an atmosphere which is both radiant and dusty, for example in the presence of silica, cement, metal slag, clinker, clay, moulding sands, ingots, castings or forgings.

Furthermore, these metal conveyors, and in particular stainless steel belts and metal mesh belts, tend to become deformed if the heat is not uniformly distributed, and their tension necessary for operating without slip is then very uncertain.

Finally, another major defect of metal conveyors is inherent to their constitution: their very conditions of operation make it necessary for them to work at low speeds, which do not exceed 1 meter per second and are generally lower than 0.5 meter per second.

It is impossible to exceed these values because any acceleration of the operation of a metal conveyor results in an increase of its defects, particularly its wear and the risk of jamming or seizing.

Thus, all-metal conveyors also have obvious limitations in their utilisation, particularly because of their antimechanical operating conditions, because of the risk of slip in the driving of the conveyors, and because of the low outputs which they yield as the result of their very slow speed of movement.

The problem of the transport of products at very high temperature is thus clearly posed:

(a) when the temperature of a product or of any part which has to be transported exceeds 200° C. the conventional solution of the conveyor of the rubber belt type or of an elevator having buckets fixed on a rubber belt becomes impossible;

(b) at temperatures higher than 350° C. the stainless steel belt itself is no longer capable of use;

(c) it is then necessary to use an entirely metal conveyor or a chain elevator. Unfortunately, this means that it is necessary to use apparatus which are often noisy, whose productivity is poor, and which are always very expensive to maintain, particularly in the case of the transporting of abrasive products such as are found in the cement, foundry, siderurgical, and glass industries.

Taking into account all that has been said above, and since the faults indicated in (c) do not occur with conveyors and elevators having a flexible belt of the rubber type, in all cases where the temperature of the products transported does not exceed the critical value of 200°–220° C. a conveyor having an endless belt of elastomer is used. A conveyor is then available which has all the advantages of flexibility and regularity of operation, which qualities are well known to be possessed not only by rubbers but also by equivalent materials of the leather and textile type.

In cases where this critical temperature of 200°–220° is exceeded, it is unfortunately necessary to use an all-metal conveyor despite all the disadvantages inherent in this type of conveyor, which are now well known to industrialists.

The present invention seeks to obviate all the disadvantages indicated above, and to this end it proposes for the transport of products at high temperature a type of conveyor or bucket elevator which makes it possible to retain the entire basic construction of apparatus having a flexible belt, particularly apparatus having a rubber belt, the conveyor or elevator being for this purpose equipped with an anti-heat device which by means of suitable insulation protects the said rubber belts against heat.

The present invention therefore has as its object the new industrial product consisting of a transport belt for a conveyor or bucket elevator, which is intended in particular for the transport of products whose temperature exceeds 200° C., the said belt being characterized in that on its outer face it carries metal means adapted to receive or pick up hot products which are to be transported, the said metal means being thermally insulated in relation to the belt by at least one thick cushion of air.

The original feature is therefore that of selecting here as insulating material the most obvious and the most directly available material, that is to say air whose remarkable insulating properties are well known.

This insulation by means of air should moreover be distinguished from insulations achieved by interposing a conventional insulating material, such as asbestos for example, between the rubber belt and the receptacle for hot products. Asbestos, which is well known for its insulating characteristics can actually protect the belt against heat for a few minutes, but then, because of the mechanical stresses generally imposed on conveyor belts, a cushion of asbestos bearing against a rubber belt will not have adequate mechanical characteristics to resist in the same way as the belt, and the cushion of abestos will then be immediately torn to pieces, or more precisely will be disintegrated into shreds.

It is therefore obvious that a solution of this kind would scarcely make it possible to withstand high temperatures for much longer than a rubber belt could do by itself.

In a first embodiment of the invention the interface between the belt and the cushion contiguous to the belt is continuous; in another embodiment the interface between the belt and the cushion contiguous to the belt is interrupted by some unidimensional parallel lines.

Various modified embodiments are also conceivable with regard to the metal means adapted to receive or pick up the hot products which are to be transported.

In a first modified embodiment these metal means rest directly on the belt, the zones of contact between them and the belt being limited to a few points and/or to a few lines.

In a second modified embodiment these metal means are at a certain distance from the belt, and they rest on a plurality of supports inserted between them and the outer face of the belt, these inserted supports being fastened on the one hand to the belt and on the other hand to the metal means.

In the last-mentioned case the inserted supports are advantageously in the form of tubes, sections of tubes, spheres, or portions of spheres.

In a particularly interesting embodiment the metal means are made in the form of profiles forming in cross-section a succession of waves or a succession of V's. The supports inserted between the metal means in an embodiment of this kind and the outer face of the belt are each disposed under the crest of a wave, the two flanks of the wave bearing against at least one inserted support, or at an arris formed at the intersection of two adjacent V's, each of the two V's bearing by their facing flanks against at least one inserted support.

This construction of undulating profiles or profiles formed of a succession of V's for transporting the hot products leads to zones of contact between the profiles and the rubber band, directly or through the medium of inserted supports, which are limited to simple unidimensional lines. In other words, the heat bridges are reduced to generatrices in the case of undulating profiles, or to arrises in the case of V-shaped profiles.

Furthermore, these profiles have natural ventilation from below at the same time as the rubber conveyor belt; moreover, the partial overlapping of two of these profiles, either on a wave or on a V, if repeated for each profile, makes it possible to form an endless receptacle, of which one advantage is that it is absolutely leakproof, since grains and pulverulent material cannot flow out between two partially overlapping profiles.

Finally, it is obvious that the invention also has as an object, by way of a new industrial product, a belt conveyor comprising a belt thermally insulated by means of at least one thick cushion of air from the metal means for transporting hot products. This conveyor may be a horizontal conveyor or else a bucket elevator in which each bucket is insulated from the belt by the anti-heat device mentioned above.

Because of the cushions of air judiciously placed between the metal supports, such as pallets or buckets, and the conveyor belt of rubber or stainless steel, it is clear that the insulation process which has been described above makes it possible to use any belt and to keep it permanently below its limit operating temperature, and that this can be achieved without any substantial modification of the belt in question.

The insulation process utilising the anti-heat device of the invention makes it possible to attain considerably higher continuous operating temperatures, for example the transport of products whose temperature exceeds 700° C. is now entirely possible with a belt which previously would not have withstood a higher temperature than 200° C. Similarly, the transport of products whose temperature exceeds 1000° C. is made possible with a belt which previously would not have withstood a limit operating temperature attaining 350° C.

It has been indicated above that the material of which the original belt is made very obviously has an influence on the limit operating temperature that can be tolerated after the belt made of that material has been equipped with the anti-heat device of the invention.

Similarly, it is quite obvious that the number of insulating air cushions interposed between the conveyor belt and the metal receptacle for the hot products also has considerable influence.

Thus, for a rubber belt whose maximum continuous operating temperature is 200° C. this operating temperature is brought to 500° C. with single insulation, and then to 700° C. for double insulation.

In the case of a stainless steel belt whose maximum continuous utilisation temperature is 350°, the operating temperature is brought to 600° C. when the stainless steel belt is equipped with the anti-heat device of the invention with single insulation, then to 900° C. with double insulation, and to a value higher than 1000° C. for triple insulation.

Finally the applicant company wishes to explain briefly the fundamental differences which exist between the antiheat device of its invention and previous conveyor systems such as those described in German Pat. No. 352,226, these conveyors comprising a belt on whose outer face are fixed plates or containers whose purpose is to permit the transport of heavy products, these plates or containers being raised in relation to the belt for the sole purpose of giving them the necessary clearance to turn around the end drums driving the belt.

Conveyors of this kind are used in mines, for the extraction of blocks of products such as coal, ores, or coke, whose mass is relatively great.

In such types of conveyor the endless belt does not possess sufficient mechanical strength to support heavy masses. Thus, in order to avoid the fracture of the belt it is covered with a number of plates which are disposed one following the other and which are obligatorily placed in a raised position in relation to the belt in order to permit sufficient clearance for each change of direction of the belt.

Since the plates are raised, there is obviously a certain cushion of air between the belt and each plate.

Nevertheless, these different cushions of air cannot in any case be confused with the anti-heat devices for the transport of hot products which the present invention proposes.

In previous devices it is in fact observed that:

(a) each plate support has large surfaces of exchange with the plates during the entire horizontal run;

(b) the heat exchanged is then transmitted to the fastening slide of the said support over the entire surface of contact of the wings of this dovetail-shaped slide;

(c) the assembly comprising the plate and plate support cannot be used for transporting hot products, since the effect of the expansion on the plates would have the consequence that the latter, whose transverse edges already abut on the horizontal run, would apply contrary thrusts to the dovetail-shaped slides. Since these slides are in full thermal connection with the belt the bolts fastening the slides would soon be torn out through the weakened belt;

(d) although a cushion of air exists between the plates and the belt, thermal insulation was never sought. It may even be stated that the construction of a conveyor suitable for conveying heavy products runs counter to the construction which permits thermal insulation of the belt.

In order for the conveyor to be able to support heavy loads by means of its plates it is in fact indispensable that the flat surface of contact of the plate on the plate support should be in a ratio of about 1:3 in relation to the surface of the plate in order to avoid overhang. It is then obvious that the surface of contact between the plates and the plate supports will then be so large that it will transmit through conduction all the heat received by each plate. The heat transmitted by each plate to its two plate supports is then transmitted in succession to the dovetail slides and then to the belt. Because of the existence of a continuous metal connection between the plates and the belt, all the heat transmitted by conduction is then concentrated on the zones of connection between the slides and the belt, that is to say it will be concentrated at the most fragile points.

Since in addition the cushions of air existing between the plates and the belt will provide protection only against transmission of heat by convection, which is slight in relation to conduction, it must finally be concluded that in practice all the heat received by the plates is concentrated on the zones of connection to the belt, thus giving rise to very rapid deterioration of the latter if it is to be used for the transport of hot products, which would fall onto the plate at temperatures of the order of 600° to 800°.

The conclusion is therefore that conveyors known for the transport of heavy products are unsuitable for the transport of hot products, despite the presence on such conveyors of a cushion of air between the endless belt and the plates.

They are unsuitable because all of the heat is transmitted to the belt.

The originality of the present invention is therefore obvious because it advocates progressive elimination of heat from the supports to the belt, and also advocates the smallest possible contacts between the supports and the belt.

In order to enable the object of the present invention to be fully understood, various forms of construction thereof will be described below as examples which are purely illustrative and not limitative, and with reference to the accompanying drawing, in which:

FIG. 8 shows three modified forms of the conveyor belt of the invention, which on its outer face carries flat metal plates adapted to receive hot products of large dimensions, these plates being thermally insulated from the belt:

Figure 5:
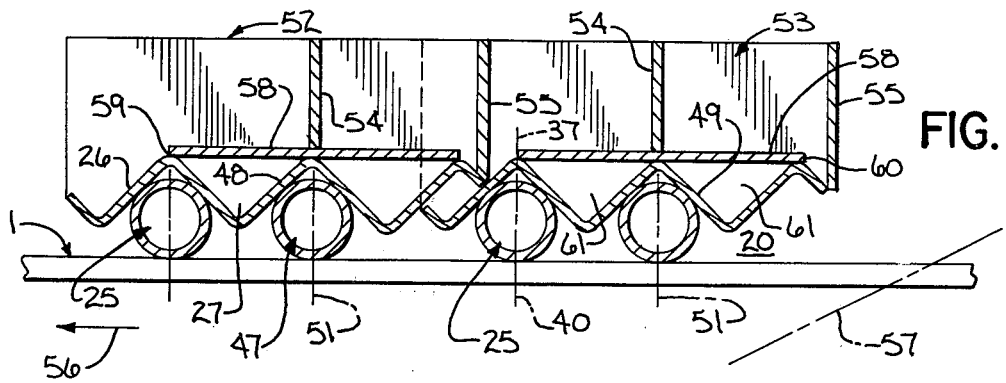
FIG. 5 is a side view of a rubber conveyor belt carrying V-shaped profiles providing double insulation between the hot products to be transported and the belt, the first insulation being achieved by interposed supports slipped between two adjacent V's and a second insulation by cavities provided in the bottom of the profiles.
Figure 11:
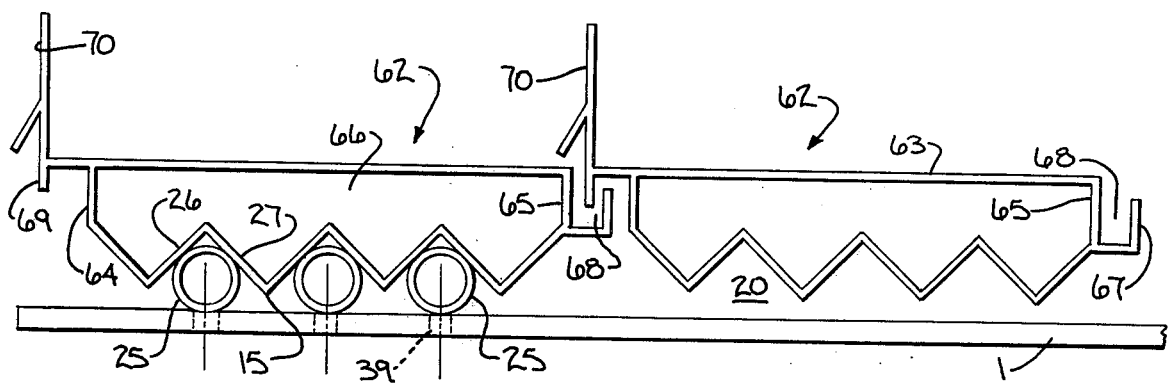
Figure 12:
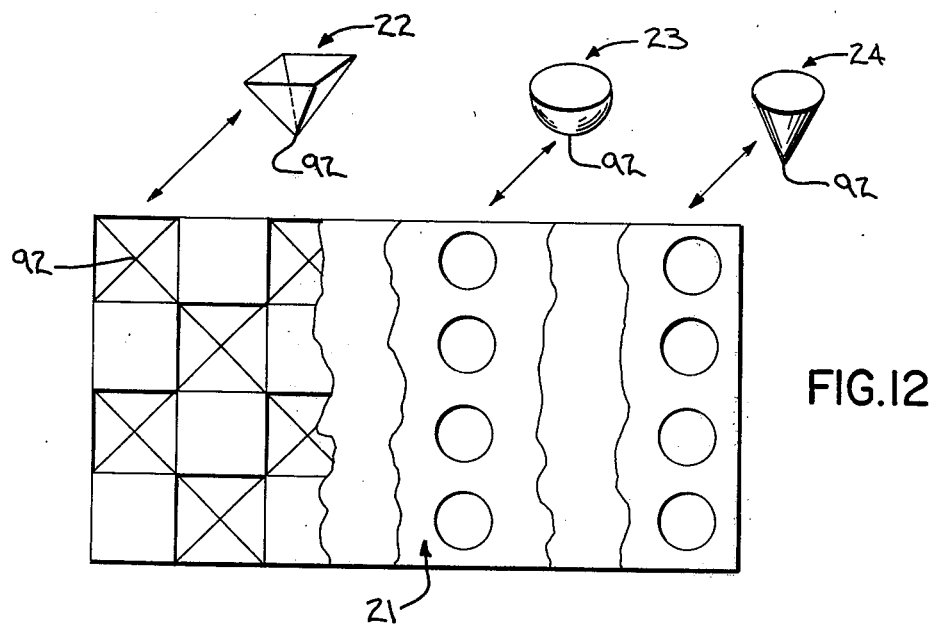
Figure 13:
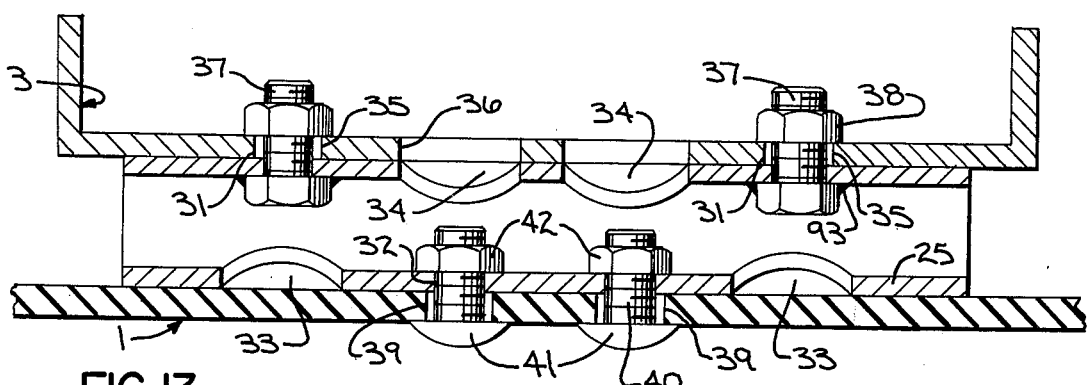

(a) by an undulating profile,
(b) by tubes or spheres,
(c) by a profile formed of a succession of V's;

FIG. 9 is a side view of an elevator whose buckets are each mounted on an insulation device having a profile composed of a succession of V's;

FIG. 10 is a side view in which each bucket is mounted on insulating tubes;

FIG. 11 shows a modified version of the double insulation illustrated for the conveyor of FIG. 5;

FIG. 12 is a top plan view of a receptacle for hot products which is composed of a planar metal sheet stamped to form frustopyramidal, frustoconical, or hemispherical cells;

FIG. 13 shows a method of fastening an insulating tube by bolting on the one hand to the belt and on the other hand to the receptacle for hot products.

Throughout the description given below the expression "rubber belt" will always be used both for horizontal conveyors and for bucket elevators. It is obvious that this word "rubber" is not absolutely limitative, since, as already stated, the invention is applicable to the insulation of all types of belt made of materials which do not possess a high standard of resistance to heat. The invention is therefore not limited in its application solely to belts of rubber, but on the contrary likewise covers belts of silicones, plastics materials, leather, or textile materials, as well as belts of stainless steel whose heat resistance is likewise poor.

Referring to the drawings, it will be seen that 1 designates the rubber belt of a horizontal conveyor, and 2 the rubber belt of a bucket elevator. However, the solutions given in the description following below as anti-heat devices for a horizontal conveyor are quite obviously applicable to a vertical elevator, and vice versa, without any previous modification.

The fundamental principle of these anti-heat devices, whatever the form of construction proposed, consists of the search for a minimum surface of contact between the rubber belt 1 or 2 and the metallic element which receives the products which are to be transported and which consequently is brought to a high temperature, which frequently is as high as 500° to 1000° C.

This minimum contact surface has been found by utilising zones of contact with the rubber belt which are limited to points (FIGS. 4, 5, 7, 8b, 12), to arrises (FIGS. 1, 9, and 8c), or to tangent lines (FIGS. 2, 3, 5, 7, 8a, 8b, 10, and 11).

Point contact can for example be obtained by means of a portion of a sphere (FIG. 12), or a sphere (FIGS. 4, 5, and 7), or by the apex of a cone or pyramid (FIG. 12).

Contact by a tangent line can be obtained for example along the generatrix of a horizontal cylindrical insulating tube, along generatrices defined by the apices of undulating profiles, along arrises which define the successive dihedra of a profile formed by V's.

The invention utilises this fundamental principle in each of the embodiments which it proposes. It is then sufficient to make use of metallic means, that is to say supports receiving or picking up the hot products which are to be transported, the structure of these means being suitable for the problems posed by the shape or dimensions of the products to be transported and by the manner in which this transport is to be effected (length of movements, slope, dimension of products, ambient atmosphere). These metal supports are therefore flat sheets, buckets, or troughs, for example, which are mounted if necessary on anti-heat devices which are also of metal and therefore resistant to higher temperatures, and which are intended to provide thermal protection for the rubber belt.

Whereas the temperature of the products transported is 500° C. or even 1000° C., the temperature of the horizontal or vertical belt remains below the critical threshold of 200° C. It is clear that this protection of the rubber belt is provided by the thick cushion of air existing between the planar or profiled metal surface, which carries the hot products, and the rubber belt. This cushion of air is in fact practically continuous (FIG. 12 in cases where the contact made by the system fastening the metal support on the belt is limited to a few points), or discontinuous, although in the latter case the cushion is interrupted only by a few unidimensional parallel lines represented by the apices of the profiled supports laid directly on the belt, or else by tangent lines defined along insulating tubes constituting supports interposed between the belt and the profiles in question.

When the temperature of the products to be transported does not exceed 500° C., the invention proposes to provide a number of suitable solutions offering simplified forms of construction: the use of a stamped metal sheet or of undulating or V-shaped profiles makes it possible for the anti-heat device to be used direct as member carrying the hot products. This is the case in the solutions illustrated in FIGS. 1, 3, and 12.

Figure 1:
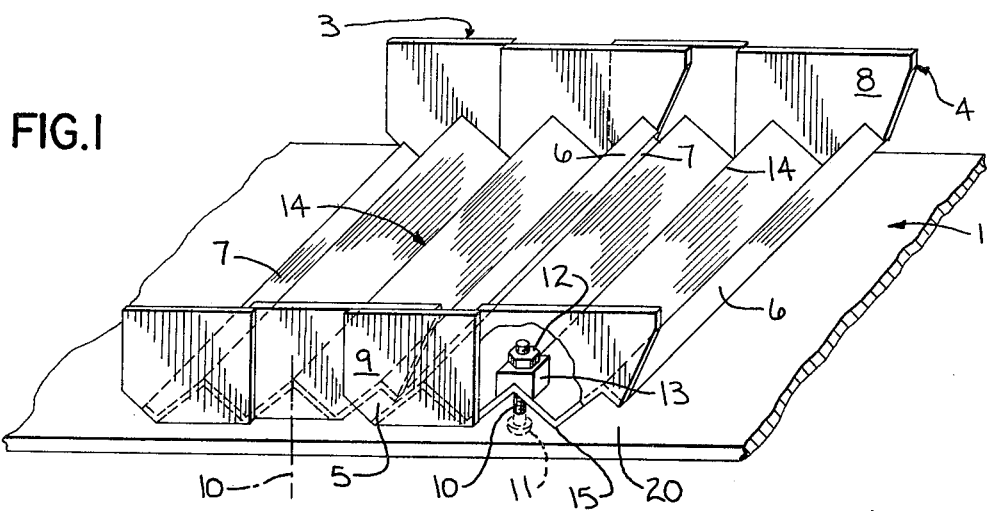
FIG. 1 is a view in perspective of a horizontal belt carrying profiles formed by a succession of V's resting directly on the belt.

In FIG. 1 a belt 1 is shown which carries two profiles 3 and 4 respectively, which are formed by a succession of V's. These two profiles have the same shape; they overlap partially, as indicated by the reference 5, the rear wing 6 of the profile 3 overlapping the front wing 7 of the profile 4. Lateral edges 8 and 9 on the right and left respectively delimit the profiles 3 and 4 transversely and form a bucket receptacle for the products to be transported. A number of receptacles placed on the belt 1 following one another and partially overlapping form an endless trough suitable for conveying products in the form of very fine grains, since tightness is ensured by the various overlaps. Each profile 3, 4 is fixed directly on the belt 1 by bolting, preferably utilising a bolt 10 having a wide head 11 bearing against the inside face of the belt 1, the bolt being locked on the bucket by a nut 12 screwed on behind a V-shaped wedge 13 which is placed above an upper arris 14 connecting two V-shaped dihedra. It is clear that the angle of the wedge 13 is equal to the angle of the dihedron formed along the arris 14, so that fastening can be effected without play.

The fastening device described above is particularly advantageous because the thermal connection between the buckets 3 and 4 and the belt 1 is reduced to the bottom arrises 15 and to the bolts 10; the latter transmit only a negligible amount of heat because they are fixed at the top of the upper arrises 14 and therefore are practically not in contact with the hot products carried, which mainly stagnate in the bottom portion of the buckets along the arrises 15.

It will be observed that in this embodiment the cushion of insulating air interposed between the belt 1 and the anti-heat device 3, 4 fixed directly on the belt is interrupted only by some unidimensional transverse lines 15.

Figure 3:
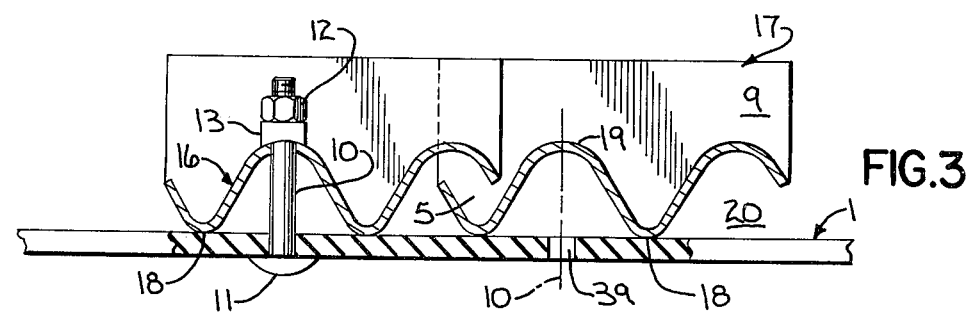
FIG. 3 is a side view of a conveyor whose rubber belt carries undulating profiles fixed directly on the belt.

The anti-heat device shown in FIG. 3 is practically identical to the device of FIG. 1, only the structure of the buckets being modified. Here each bucket has the form of an undulating profile 16 and 17 respectively, resting on the horizontal belt 1 by the generatrices 18 formed by the hollow of each wave. The buckets are fixed directly on the belt by bolts having a wide head, which are represented by their stems 10 passing through the top 19 of each wave and held by a nut 12 locked by the wedge 13.

The buckets 16 and 17 also partly overlap in the zone 5, while each of them remains insulated from the adjacent buckets. In this second example it will be observed that the insulating air cushion 20 is interrupted only by the generatrices 18.

In the example shown in FIG. 12 the metal means intended to receive the hot products to be transported are made in the form of a plate 21 provided from place to place with stamped pockets having the shape of a truncated pyramid 22, a portion of a sphere 23, or a truncated cone 24. In the three types of pocket referred to the surface of contact between the belt 1 and the anti-heat device 21 is limited to points 92 defined by the apex of the pyramid or cone or by the bottom of the portion of the sphere. The interface between the belt 1 and the insulating air cushion 20 contiguous to the belt is this time continuous.

As a modified embodiment the stamped pockets may be in honeycomb form.

In the most stringent cases where the temperature of the products to be transported is higher than 500° C. and may be as high as 1000° C., the same basic principle of a cushion of air 20 interposed between the belt and the receptacle for the hot products is adopted, double insulation being provided in this case.

A first insulation is obtained at each metallic member carrying products and in this connection the metal member is, as in the previous case, made in the form of a profile having in cross-section a succession of V's, such as 3 and 4, or a succession of waves such as 16 and 17, or in the form of a plate such as 21 bearing by means of a series of points.

However, instead of having these metallic means (V-shaped, undulating, or in the form of stamped pockets bearing by means of points) supported directly on the rubber belt, as indicated in the three preceding examples, the metal means 3-4-16-17-21 are on this occasion held at a certain distance from the belt, resting on a number of supports interposed between the outer face of the belt 1 and the metal profiles.

In order that the desired insulation may be obtained under the best possible conditions, it is obvious that these interposed supports themselves utilise the basic principle of the invention, that is to say their contact with the belt 1 on the one hand and with the metal profiles on the other hand is limited to simple points or tangent lines. The interposed supports utilised for this purpose will be tubes, sections of tubes, spheres, or portions of spheres for example. These supports will moreover be used to fasten the metal profiles on the belt, in such a manner as to reduce still further the thermal connections between the metal profiles, which are brought to a high temperature by the products transported, and the rubber belt which is to be protected. Each interposed support will therefore be fastened not only to the belt but also to the metal profile placed above and at a distance from the belt.

Figure 2:
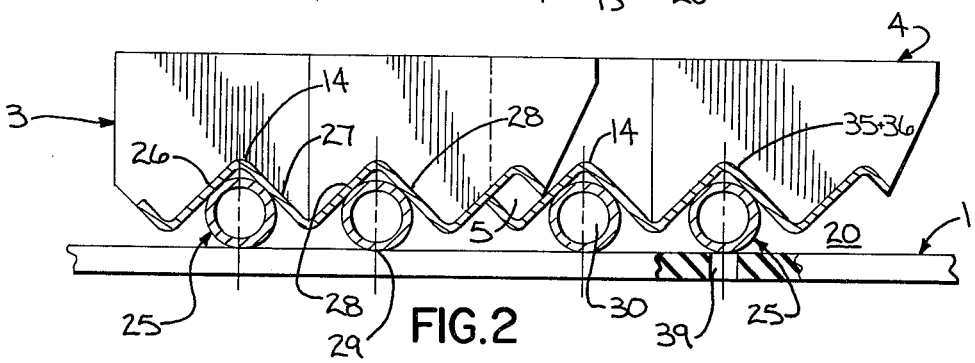
FIG. 2 is a side view of a belt carrying the profiles of FIG. 1 which are separated and insulated from the belt by fastening tubes.

In the example of FIG. 2 the metal profiles used are the profiles 3 and 4 of FIG. 1, once again placed so as to be partially overlapping. Each profile rests on two parallel fastening tubes 25, each of these tubes being situated at the upper arris 14 defined at the intersection of two adjacent V's. It is seen that in each case the two adjacent V's bear by their facing flanks 26 and 27 against the interposed tube 25.

The transmission of the heat of the products transported to the belt is therefore still further considerably reduced. Firstly, the heat is conducted to the tubes only by the two tangent lines 28, and then it is conducted from the tubes to the belt only by the bottom generatrices 29 with intermediate dispersal due to the presence of the cushion of air 20 providing ventilation under the profiles.

The central passage 30 inside each tube 25 also assists the dissipation of heat between the tangent lines 28 and the bottom generatrix 29. This dissipation is such that in all cases the temperature of the rubber belt remains below 200°0 C.

Each tube 25 is fixed at its bottom to the belt 1 and by its top to a metal profile. In FIG. 13 is shown a method of fixing which is particularly advantageous because it corresponds to the least possible transmission of heat from the profile to the belt.

In this respect, instead of proposing a fixing device which passes entirely through each tube 25 so as to connect a metal profile to the belt directly by means of bolts and nuts, as proposed for example in FIG. 1—a device which would have the disadvantage of constituting a direct thermal connection between the hot products and the belt, the invention proposes firstly to connect each tube to a profile and then, by separate means, to connect the resulting assembly to the rubber belt. Each tube 25 accordingly has two apertures 31 provided in its top portion, each in a marginal zone, and two apertures 32 provided in its bottom portion in the central zone. Opposite each aperture 31 the tube has a cutout 33 leading into the passage 30. Similarly, opposite each aperture 32 the tube has a cutout 34 which likewise leads into the central passage 30. The two cutouts 33 are therefore disposed in the bottom portion of the tube, each in a marginal zone, while the cutouts 34 are each provided in the upper portion of the tube and in the central zone. Finally, each profile 3 and 4 is provided along its upper arrises 14 with two apertures 35, disposed in such a manner as to be in alignment with the apertures 31 in the tube 25, and also two apertures 36 which are disposed in the central zone and are in alignment with the cutouts 34.

The profiles 3 and 4 are then fastened to the belt 1 in the following manner.

A bolt 37 is introduced into each cutout 33 in such a manner that the stem of the bolt passes through the aperture 31. Each bolt head is then welded to the inside wall of each tube 25 by weld spots 93. Apertures 39 are moreover provided throughout the thickness of the belt 1 in positions corresponding to the bottom apertures 32 of the tubes 25 in each zone of the belt which is intended to receive one of these tubes.

Through the lower side of the belt a bolt 40 having a wide head 41 is then introduced into each aperture 39 and then into each aperture 32, and each of these bolts 40 is secured with the aid of a nut 42 which is introduced into the interior of the tube 25, in a position facing the stem of the bolt, by passing it into the aperture 36 and then into the cutout 34. Perfect tightening of the nut 42 against the inside wall of the tube, around the stem of the bolt 40, is achieved with the aid of a tool passing through the said aperture and the said cutout.

The tubes 25 resting on the belt 1, and then being fastened to the said belt, the metal profiles 3 and 4 are placed on the tubes 25 by bringing the apertures 35 opposite the stems of the bolts 37 and then passing each stem into the interior of the corresponding aperture until the metal profiles rest by their flanks 26 and 27 on the tubes. To complete the connection all that then remains to be done is to tighten a nut 38 on each stem of a bolt 37, which is welded by its head to an insulation tube.

The fastening system thus proposed provides two advantages: firstly no previous modification of the rubber belt is required, except of course the provision of some apertures 39 for the passage of the fastening bolts; secondly, it contributes towards the desired dissipation of heat between the metal profile and the belt since there is no direct thermal connection between a bolt 37 and a bolt 40, the connection being made indirectly through the side wall of the tube 25, thus ensuring much greater dissipation because the surface along which heat is exchanged is larger.

Figure 4:
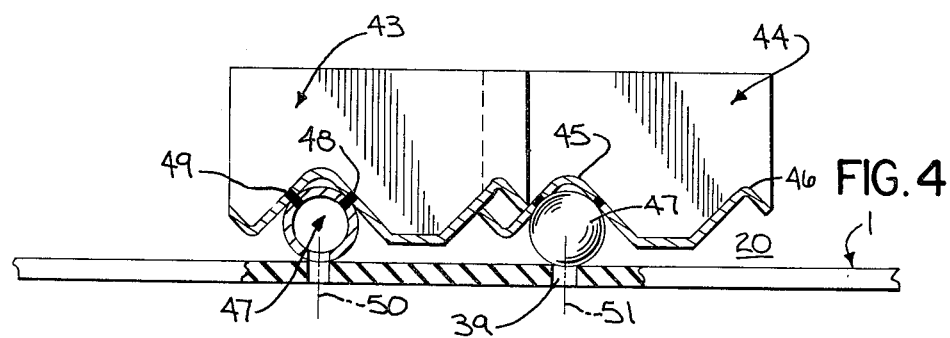
FIG. 4 is a side view of a conveyor whose rubber belt carries profiles of any kind which are separated and thermally insulated from the belt by means of interposed supports which on the one hand are bolted to the belt and on the other hand are welded to the profiles.

In the example shown in FIG. 4 the metal profiles used have a shape roughly similar to an omega. Viewed in longitudinal section in this Figure, each profile 43-44 therefore has a front gutter 45 and a rear gutter 46 under which are interposed preferably hollow spheres 47 whose diameter is greater than the height of the gutter. The profiles 43 and 44 are thus placed above the belt 1 and there is now no direct thermal connection between the profiles and the belt. A first insulation is provided by the cushion of air 20 interposed between the upper face of the rubber belt and the lower face of the metal profiles. A second insulation is provided by the hollow spheres 47, which have only two point contacts 48 and 49 with each profile and one point contact with the rubber belt.

Each sphere 47 is fastened both to a metal profile and to the belt. In order to avoid direct transmission of heat from a profile to the belt through a single fastening device, use is here made, as in the preceding example, of separate connections for each sphere to the profile on the one hand and to the belt on the other hand. Since the spheres 47 are of metal, they are welded to the flanks of the gutters 45 or 46 by spot welds 48 and 49. Each sphere is then fixed to the rubber belt by means of a bolt 40 represented in the drawing by its axis 51 passing through the bottom tangential point 50 of the belt 1 on the sphere.

In this example the interface between the belt and the contiguous cushion of air 20 is continuous because the zones of contact between the metal parts and the belt are limited to a few points 50.

In still more stringent cases where greater thermal protection is required, for example in cases where the resistance to heat of the rubber belt is poor, the invention proposes to multiply the insulation stages, and for this purpose quite obviously continues to apply the fundamental principle of a plurality of cushions of air 20 interposed between the belt and the receptacle for the hot products.

This solution provides another advantage: for the same rubber belt whose limit of resistance to heat is conventionally from 200° to 220° C., the transmission of heat is limited on each occasion by multiplying the insulation stages, and consequently it becomes possible to transport products whose temperature is still higher by using more than two insulating cushions.

Figure 6:
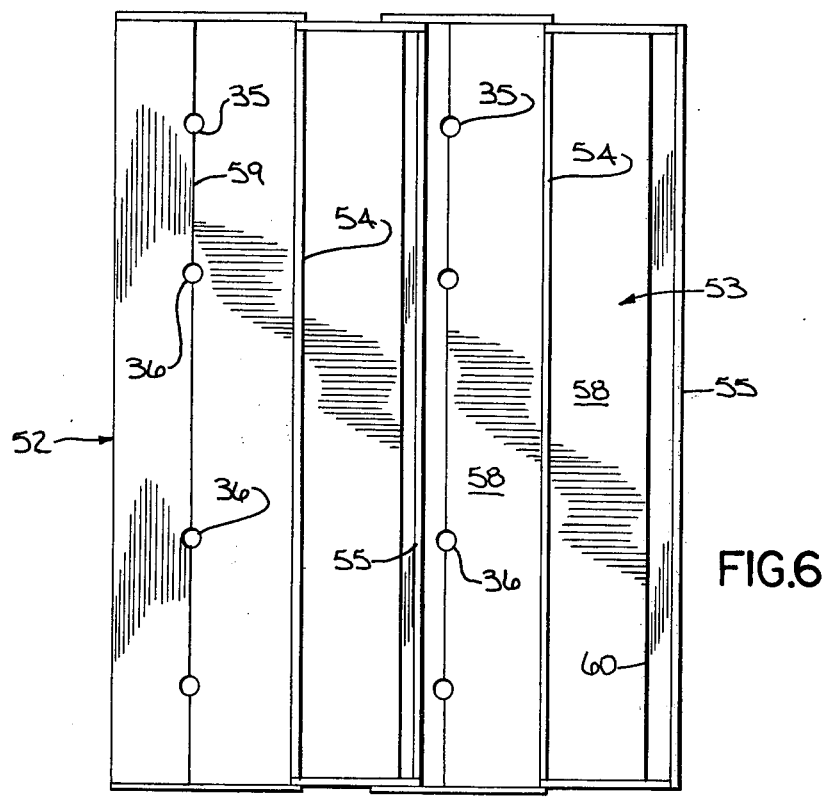
FIG. 6 is a top plan view of the V-shaped profiles of FIG. 5, each constituting a trough having two compartments.

In FIGS. 5, 6, and 11 two embodiments are shown which have an additional stage of thermal insulation in the bottom of the metal profiles. It is however clear that without departing from the scope of the present invention it is possible to conceive similarly the utilisation of metal profiles having two, three, or even more insulation stages interposed in the bottom of the metal means, which remains insulated from the belt through the first cushion of air 20.

In the first embodiment, which is shown in FIGS. 5 and 6, each metal profile 52, 53 has a general shape identical to the profiles 3 and 4 described previously, but this time is supplemented by an internal transverse partition 54 and by a rear partition 55 parallel thereto. The purpose of the partitions 54 and 55 is to retain the products in cases where the belt conveyor 1 raises the products in the direction 56 inclined at a great angle to the horizontal, represented in the drawing by the dot-dash line 57.

Above the flanks 26 and 27 of the V's each profile has a horizontal floor 58 extending from the upper front arris 59 to the upper rear arris 60. Each profile 52, 53 thus contains in itself, because of the cavities 61 left between the floor 58 and the flanks 26, 27, a cushion of air which, in conjunction with the first cushion of air 20 insulating the profiles from the belt, will further assist the dissipation of heat.

In order to increase this dissipation still further, the profiles 52 and 53 are obviously insulated from the belt by interposed supports, either in the form of tubes 25 fixed to the profiles by first bolts 37 and to the belt by second bolts 40 (as shown in FIG. 13), or by hollow spheres 47 fastened to the profiles and to the belt as already indicated in FIG. 4, that is to say by spot welds 48 and 49 and by bolts 51 respectively.

Viewed from above in FIG. 6, the profiles 52 and 53 can be seen moreover to have along their front arris 59 the two apertures 36 provided in their central portion for the passage and handling of the fastening nuts 42, and also the two apertures 35 which are each provided in a marginal zone and which permit the passage of the stem of the bolt 37 and enable the tubes 25 to be fastened to the metal profiles by means of the nut 38.

In the second embodiment, illustrated in FIG. 11, the bottom of the metal profile 62 is provided with a horizontal floor 63 connected to the succession of V's by a front wall 64 and a rear wall 65. The cavity 66 bounded between these parts constitutes the first insulation against the hot products placed on the floor 63. The profile 62 is insulated from the belt by means of tubes 25 resting against the flanks 26 and 27 of the V's. The tubes are fastened in the manner illustrated in FIG. 13. Between the lower arrises 15 of the V's and the belt 1 there thus exists a thick cushion of air which contributes towards protecting the belt.

For the profiles 62 provision has also been made for a partly overlapping arrangement between them, in such a manner that a transport device having no discontinuities is obtained. A U-section 67 is used for example, and is welded by one flange to the wall 65 so as to form a gutter 68 which in its interior receives a lug 69 provided on the front portion of the following profile, below a partition 70 whose purpose is to permit the transport of the hot products along a steeply sloping conveyor.

In cases where the hot products to be transported require carrier profiles having a flat bottom, the simplest insulation will be provided by the carrier elements supported by interposed supports according to the invention, as already described in connection with FIGS. 2, 4, 5, 11, and 13.

Figure 7:
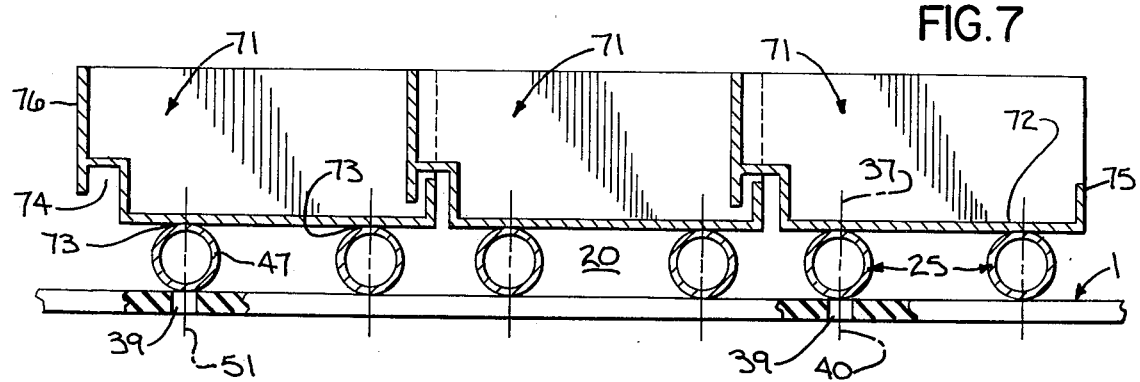
FIG. 7 is a side view of a modification of FIGS. 2 and 4, in which the profiles have a flat bottom parallel to the belt and insulated from the latter by fastening tubes.

Referring to FIG. 7, a number of identical buckets 71 are provided, whose flat bottom 72 rests on insulating tubes 25 or insulating spheres 47 as described previously. The tubes 25 used with the rear bucket are fixed to the bucket and to the belt 1 by the bolts 37 and 40 respectively. The spheres 47 used with the front bucket are for example welded by a spot weld 73 under the flat bottom of the bucket in question, and each of them is fixed by a bolt 51 through cooperation with apertures provided for the purpose in the belt 1.

The buckets are thermally insulated from one another, but they partly overlap through the action of their front portions 74, which are in the shape of an inverted U and between the flanges of which the raised rear edge 75 of the preceding bucket is interposed. A vertical wall 76 permits the utilisation of such buckets for the transport of products on an inclined conveyor.

In the case of FIG. 7, the insulation of the belt is effected by a single cushion of air 20, the thickness of which is equal to the diameter of the insulating tubes or spheres.

FIG. 8 shows three arrangements having a flat surface for the transport of long loads. Referring to FIG. 8a, the arrangement shown comprises a flat plate 77 whose bottom face is spot welded along the upper generatrices 78 of an undulating profile 79 fixed to the horizontal belt 1 by bolts 40 having a wide head 41 and secured by nuts 42 after passing through holes 39 provided for the purpose in the belt 1. This system of fastening is identical to that proposed for the bottom part of the tubes 25 and illustrated in FIG. 13. Holes 80 formed in the plate 77 permit the introduction and tightening of the nuts 42.

In FIG. 8b is shown a flat plate 81 whose bottom face is welded to the top of hollow spheres 47 secured to the belt 1 by bolts 51 passing through the holes 39.

In FIG. 8c is shown a flat plate 82 whose bottom face is spot welded to the upper arrises 83 of a metal profile 84 formed by a succession of V's. The profile 84 is fixed to the belt by bolts of the type 40–41 referred to previously, whose stems pass through the holes 39 formed in the belt, so as to be secured in nuts 42 introduced and manipulated with the aid of apertures 85 provided facing the holes 39 and extending through the entire thickness of the plate 82.

The arrangement shown in FIG. 8b, which uses hollow spheres 47 for insulation purposes, can obviously be applied without further modification to insulating tubes 25 of the type described previously, particularly in connection with FIGS. 2 and 13.

It has already been indicated that the invention is also applicable to vertical bucket elevators.

In this connection, it will be seen on reference to FIG. 9 that a vertical belt 2 is shown on which V-shaped profiles 86 are bolted. The bolting is of the type proposed in FIG. 8c. However, in the case of an elevator a single bolting along the upper arris 87 of each profile 86 is sufficient, since the whole of the bottom portion of the profile in question is applied against the rubber belt by simple gravity. Each of the buckets 88, which are separated from one another, is welded by its rear face 89 parallel to the belt 2 on at least two arrises 90 of the profiles on the opposite side to the arrises 87 bearing against the belt.

It is clear that in this embodiment the insulation arrangement proposed in the form of V-shaped profiles may be replaced by undulating profiles of the type shown in FIG. 8a.

FIG. 10 shows an anti-heat device fairly similar to that of FIG. 9, for a bucket elevator. The cushion of air 20 thermally insulating the rubber belt 2 from the buckets 88 is obtained by interposing tubes 25 bolted on the belt through holes 39 and bolted on the buckets, or else spot welded, along their upper generatrices 91, as shown in the drawing.

It should be noted that in all the embodiments described above which utilise the basic principle of endeavouring to obtain minimum contact between the carrier profile (or its support) and the belt which is to be protected, it is permissible to retain the entire original transport means (conveyor or elevator) having a rubber belt. In its practical application this results in very flexible operation of the rubber belt provided with its anti-heat device or devices, because in fact the flexibility of the new transport system is the same as that of the rubber belt. The operation of all transport means equipped in the manner proposed by the invention is moreover noiseless, gives rise to no heterogeneous expansion because each insulated metal carrier profile has complete autonomy in respect of expansion, while there is no risk of slipping because the rubber belt works under normal conditions of temperature and tension, so that perfect driving is ensured, and at very high speeds which may be as high as 4 meters per second, since the drive of the belt is not in itself modified by the addition of the anti-heat devices.

The invention is naturally not limited to the modes of application or to the forms of construction which have been mentioned, and various modifications could be conceived without thereby departing from the scope of the present invention. This applies particularly to the shape of the metal profiles supporting the products, which shape may vary widely; the profiles may be of any type, having a flat or profiled bottom, with or without edge pieces, with or without partitions depending on the inclination of the conveyor, and with or without overlapping between two elements, depending on the nature of the products to be transported. The spirit of the invention would not be modified by applying to these metal profiles an anti-heat device thermally insulating them from the rubber belt which is to be protected, by means of at least one cushion of air 20 of the type shown in FIGS. 1 to 5 and 7 to 11, the thickness of this cushion of air being between 10 and 150 mm, preferably between 25 and 60 mm. It is clear that the thickness of the cushion of air is moreover technically suitable for parameters such as: temperature of the hot products to be transported, resistance to heat of the elastomer of which the belt 1 or 2 is made, the proportion of impurities contained in the air because of the environment, and the loads transported. This thickness is obviously the greater, the greater the risk of transmission of heat from the products to the belt, whether this risk is due to transmission by conduction, by convection, or by radiation.

In another embodiment the anti-heat device of the invention is obtained by utilising an improved conveyor belt having on its outer face, opposite metal means receiving hot products, projections such as points or ribs, parallel or interlaced, on which the said metal means or interposed supports for the said means will rest.

In a construction of this kind the belt can easily be insulated thermally from the hot products, because in effect a cushion of air is formed between the bottom face of the said receptacle and the outer face of the belt, the reliefs provided on the said outer face limiting to a few points, and/or to a few parallel or intersecting lines, the zones of contact between the hot receptacle and the belt which is to be protected.

It is clear that the height of the points and/or of the ribs, since this height is equivalent to the thickness of the cushion of air, must be calculated with the greatest precision because it will determine the quality of the insulation.

The metal means may rest directly on the said points or the said lines but, as an obvious modification, the interposed supports provided in FIGS. 2, 4, 5, 7, 8, 9, 10, 11, and 13 may be interposed between the belt which is to be protected and the hot receptacle.

It should be observed that the device proposed by the invention permits all combinations of conveying and elevation through the multiple shapes of receptacles available: flat pallets for bulky hot loads (FIG. 8), partioned pallets for steep slopes (FIGS. 5, 7, and 11), buckets for elevators (FIGS. 9 and 10).

Better still, the device of the invention makes it possible for conveying and elevating to be combined in a single apparatus, with all the desired inflexions of slope (concave or convex).

Whatever their design, all the apparatuses designed according to the present invention are extremely reliable and ensure excellent resistance:
- to heat (higher than 1000° C.),
- to wear (minimum maintenance costs),
- to the most severe conditions of use (abrasive powders, violent shocks, for example).

The invention is hereby claimed as follows:

1. A transport belt for a conveyor useful for the transport of products whose temperature exceeds 200° C. comprising a flexible flat belt and on its outer face metal carrier means having one upper surface adapted to receive or pick up the hot products which are to be transported and a lower outer surface facing the outer face of said belt, means securing said metal carrier means to said belt, the lower outer surface of said metal carrier means being at least partially thermally insulated from the outer face of said belt by at least one cushion of air, said cushion of air being formed at least in part by said lower outer surfaces of said metal carrier means which comprises one or more inverted V's and in part by a transversely extending tubular member having its outer surface contacting the inner surfaces of the inverted V, said tubular member being in line contact with the outer face of said belt and providing a plurality of line contacts with the outer surfaces of said inverted V's.

2. A transport belt for a conveyor as claimed in claim 1 in which said tubular members which make a line contact between the outer face of said belt and the lower outer surface of said metal carrier means are secured by fastening means extending through said belt into the interior of said tubular members and by fastening means extending from the interior of said tubular members through the lower outer surface of said carrier means, said tubular members having apertures therein opposite said fastening means to permit the insertion of tools for securing said fastening means.

* * * * *